United States Patent
Boreham et al.

(10) Patent No.: US 9,304,975 B2
(45) Date of Patent: Apr. 5, 2016

(54) GLUING LAYOUT CONTAINERS

(75) Inventors: Ian Robert Boreham, Gordon (AU);
Allen Peter Courtney, Brooklyn (AU);
David Grant McLeish, Wentworthville (AU)

(73) Assignee: Canon Kabushiki Kaisha, Tokyo (JP)

( * ) Notice: Subject to any disclaimer, the term of this patent is extended or adjusted under 35 U.S.C. 154(b) by 1953 days.

(21) Appl. No.: 12/062,810

(22) Filed: Apr. 4, 2008

(65) Prior Publication Data

US 2008/0256440 A1 Oct. 16, 2008

(30) Foreign Application Priority Data

Apr. 13, 2007 (AU) .................................. 2007201627

(51) Int. Cl.
*G06F 17/00* (2006.01)
*G06F 17/21* (2006.01)

(52) U.S. Cl.
CPC ............ *G06F 17/211* (2013.01); *G06F 17/212* (2013.01)

(58) Field of Classification Search
CPC .............................. G06F 17/212; G06F 17/211
USPC .......................................................... 715/247
See application file for complete search history.

(56) References Cited

U.S. PATENT DOCUMENTS

| | | | | |
|---|---|---|---|---|
| 5,796,401 A * | 8/1998 | Winer | ............................ | 345/619 |
| 6,380,954 B1 * | 4/2002 | Gunther | ........................ | 715/764 |
| 6,826,727 B1 * | 11/2004 | Mohr et al. | .................... | 715/235 |
| 7,093,196 B1 * | 8/2006 | Griffiths et al. | ............... | 715/246 |
| 7,203,902 B2 * | 4/2007 | Balinsky | ........................ | 715/243 |
| 7,676,741 B2 * | 3/2010 | McGatha | ............ | G06F 17/2247 715/205 |
| 7,930,632 B2 * | 4/2011 | Takashima et al. | ........... | 715/243 |
| 7,984,374 B2 * | 7/2011 | Caro et al. | ..................... | 715/255 |
| 2005/0172221 A1 * | 8/2005 | Kobashi et al. | ............... | 715/513 |
| 2005/0172226 A1 | 8/2005 | Kobashi et al. | ............... | 715/518 |
| 2005/0223319 A1 | 10/2005 | Ohashi et al. | | |
| 2006/0031773 A1 | 2/2006 | Uchida | .......................... | 715/760 |
| 2006/0066902 A1 * | 3/2006 | Matsui et al. | ................ | 358/1.16 |
| 2006/0198555 A1 | 9/2006 | Hosotsubo | | |

FOREIGN PATENT DOCUMENTS

| | | |
|---|---|---|
| AU | 2004203112 A1 | 5/2005 |
| EP | 1 560 127 | 8/2005 |
| EP | 1 624 381 | 2/2006 |

OTHER PUBLICATIONS

Meyer, "CSS: The Definitive Guide," Chapter 10, 3rd Ed., published Nov. 2006, 28 pages.*
Horton, "Ivor Horton's Beginning Java TM 2, JDK TM 5 Edition," Chapter 17, copyright 2005, 43 pages.*
Notice of Acceptance of foreign counterpart application Australian Patent Application No. 2007201627, mailed Nov. 10, 2010.

* cited by examiner

*Primary Examiner* — Amelia Tapp
(74) *Attorney, Agent, or Firm* — Fitzpatrick, Cella, Harper & Scinto (57) ABSTRACT

A method is disclosed for laying out a plurality of containers on a page to generate a document upon insertion of content in the containers. The containers each have edges whose position upon layout is independent of the dimensions of the content inserted in each container. An association is created between an edge of a first container and an edge of a second container that is parallel and opposed to the first edge which constrains the second edge to a relation to the first edge. The page may then be laid out using the containers such that the edge of the first container moves dependent on the dimensions of content inserted in the first and second containers.

26 Claims, 11 Drawing Sheets

GLUING LAYOUT CONTAINERS

CROSS-REFERENCE TO RELATED PATENT APPLICATIONS

This application claims the right of priority under 35 U.S.C. §119 based on Australian Patent Application No. 2007201627, filed Apr. 13, 2007, which is incorporated by reference herein in its entirety as if fully set forth herein.

TECHNICAL FIELD OF INVENTION

The current invention relates to document layout and, in particular, to setting constraints on containers to hold content to be laid out in a document.

RELATED BACKGROUND ART

Page layout is the art of positioning elements, such as text and graphics, on a page with the aim of creating a desired aesthetic effect for a document. Whilst this may be done manually, modern approaches involve representing the elements and the page electronically in a computer system whereupon the page may be subsequently reproduced, perhaps on a video display device but typically the page targeted for reproduction by printing.

In order to realise a certain aesthetic effect, the document author will want to retain control over most aspects of page layout. However, there are some circumstances under which a certain degree of automated layout, within specified constraints, is of great benefit.

Variable Data Printing, or VDP, is an example of a class of software applications that benefit from constraint-based automatic layout. VDP allows for the printing of a large number of documents, each of which contains text and graphics that have been customised to the document's recipient by inclusion of so-called variable text and graphics.

A VDP document is typically formed from a template containing static text and graphic objects. The document author then adds placeholders to the template. The placeholders define how elements, such as variable text and graphic objects, are to be selected and laid out within the document to be produced.

A container defines an area on a page that can hold display content, such as images, text, or other media elements. Containers have a size and position that can be fixed on the page, or which can be varied by negotiating for space with other containers. A container's bounds are not necessarily confined to the printable area of the page. A straight line segment of the border of a container is referred to as an edge.

An edge can either be either fixed or movable. A fixed edge has a constant absolute position on the page. A movable edge has a position that can change according to certain placed elements and the rules of one or more of the containers.

Multiple graphical and text elements may be used in the layout. These elements may vary in size and proportion. Without constraint-based automatic layout, each element would be assigned to a container with fixed edges. However, this inflexible approach can lead to an inappropriate amount of space being allocated in many instances.

For example, two adjacent containers of the same size could be occupied by images with greatly differing sizes, leading to the larger image being scaled down and the smaller image failing to fill its space. This can also lead to undesired space around and between elements, due to the actual element differing in aspect ratio from the allocated container. Better results may be obtained if the neighbouring containers can negotiate between each other to determine the best area to allocate to each container. Such negotiation is typically carried out by an automatic layout process using the constraints and the element properties.

There are other (non-VDP) applications which nevertheless are template based. Templates are very good at defining precise layouts, into which content may be inserted. However, it is desirable to define a template which defines a general appearance, but allows the flexible use of different numbers and size of elements. This allows multiple documents to be produced with a similar appearance from a single template. It can also free the document author from some tedious aspects of manually balancing elements against each other.

It is therefore desirable to have a mechanism to set constraints to allow containers to negotiate with each other to determine the size of each container.

Previous solutions have involved the addition of some kind of visual connection between containers to constrain them. As an example, some previous solutions have employed the use of a device called a "strut". Struts may either be explicitly added to the template by the user, or automatically added by the application. Struts operate to constrain two container edges to the same relative distance apart, regardless of their absolute position on the page.

Struts, and other visual devices for associating and constraining pairs of containers, add visual clutter to the layout, and are limited to each constraining a single pair of edges. In addition, edges have to be manually set to be movable or fixed. This means that the outer boundary has to explicitly be constrained. For example, consider a container on a page with one edge set to be movable. Unless the edge movement is limited by a maximum size setting on the container, or an explicit border placed on the page, this edge can move without limit, even extending beyond the printable area of the page.

SUMMARY OF THE INVENTION

Disclosed is an approach for setting containers in a page layout that provides for arbitrated or negotiated changes in size of associated containers dependent upon content inserted therein.

In accordance with one aspect of the present disclosure there is provided a method of laying out a plurality of containers to generate one or more documents upon insertion of content in the containers, said method comprising the steps of:

(a) creating a plurality of containers, each said container having edges whose position upon layout is independent of the content inserted in said containers;

(b) creating a guide in fixed relation to a first edge of one said container;

(c) creating an association between said guide and an edge of a further said container that is parallel and opposed to said first edge, said association constraining said edge of said further container to be in relation to said guide; and (d) laying out said containers such that said guide moves dependent on the content inserted in said containers.

Desirably the guide moves dependent on content inserted in said one container and content inserted in said further container.

In accordance with one aspect of the present disclosure there is provided a method of laying out a plurality of containers to generate one or more documents upon insertion of content therein, said method comprising the steps of:

(a) creating a plurality of containers, each said container having edges whose position upon layout is independent of the content inserted in said containers;

(b) creating an association between an edge of a first said container and an edge of a further said container that is parallel to said first-mentioned edge, said association constraining said edge of said further container to be in relation to said first-mentioned edge; and (c) where said edge of said further container is opposed to said first-mentioned edge, laying out said containers such that said first-mentioned edge moves dependent on the content inserted in said containers; and (d) where said edge of said further container is unopposed to said first-mentioned edge, laying out said containers such that said first-mentioned edge is fixed on the page.

In accordance with one aspect of the present disclosure there is provided a method of laying out a plurality of containers on a page to generate one or more documents upon insertion of content in the containers, said method comprising the steps of:

(a) creating a plurality of containers, each said container having edges whose position upon layout is independent of the dimensions of the content inserted in said container;

(b) creating an association between an edge of a first said container and an edge of a second said container that is parallel and opposed to said edge of said first container, said association constraining said edge of said second container to be in relation to said edge of said first container;

(c) creating an association between an edge of a third said container and an edge of another one of said containers on the page, said edge of said another container being parallel and unopposed to said edge of said third container, said association constraining said edge of said another container to be in fixed relation to said edge of said third container; and (d) laying out said containers such that said edge of said first container moves dependent on the dimensions of content inserted in said first and second containers.

In this aspect, said another container may comprise one of said first container and said second container, or alternatively a fourth said container.

In accordance with one aspect of the present disclosure there is provided a method of setting positional constraints on a plurality of containers adapted to be laid out upon insertion of content in the containers to generate one or more documents, each said container having at least one edge whose position is constrained by setting to be either content-independent or content-dependent in at least one direction, said method being characterised in that the action of setting the position of said at least one edge to be content-dependent in a particular direction, bounds the position of said one edge in said particular direction if the position of said one edge would otherwise not have been bounded.

In specific implementations at least one of the containers may comprise a plurality of sub-containers in which content is placed upon laying out the page, wherein positions of the sub-containers with the one container is determined by constraints associated with the sub-containers.

Other aspects are also disclosed including a GUI for implementing the lay out processes, a computer program therefore and apparatus for performing the methods and GUI.

BRIEF DESCRIPTION OF THE DRAWINGS

At least one embodiment of the present invention will now be described with reference to the drawings in which.

DETAILED DESCRIPTION INCLUDING BEST MODE

Disclosed is a flexible way of constraining combinations of containers to be laid out on a page, including setting the outer boundary of the containers, without adding excessive visual clutter to the layout, and without being limited to pairs of containers.

Figure 4:
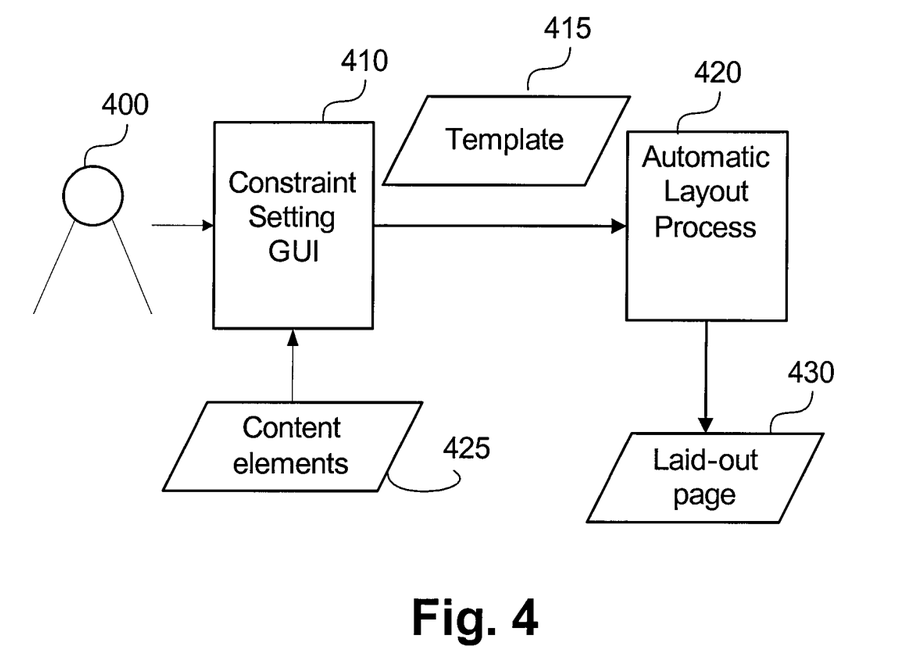
FIG. 4 is a software architecture diagram representing a context of the present disclosure.
Figure 5:
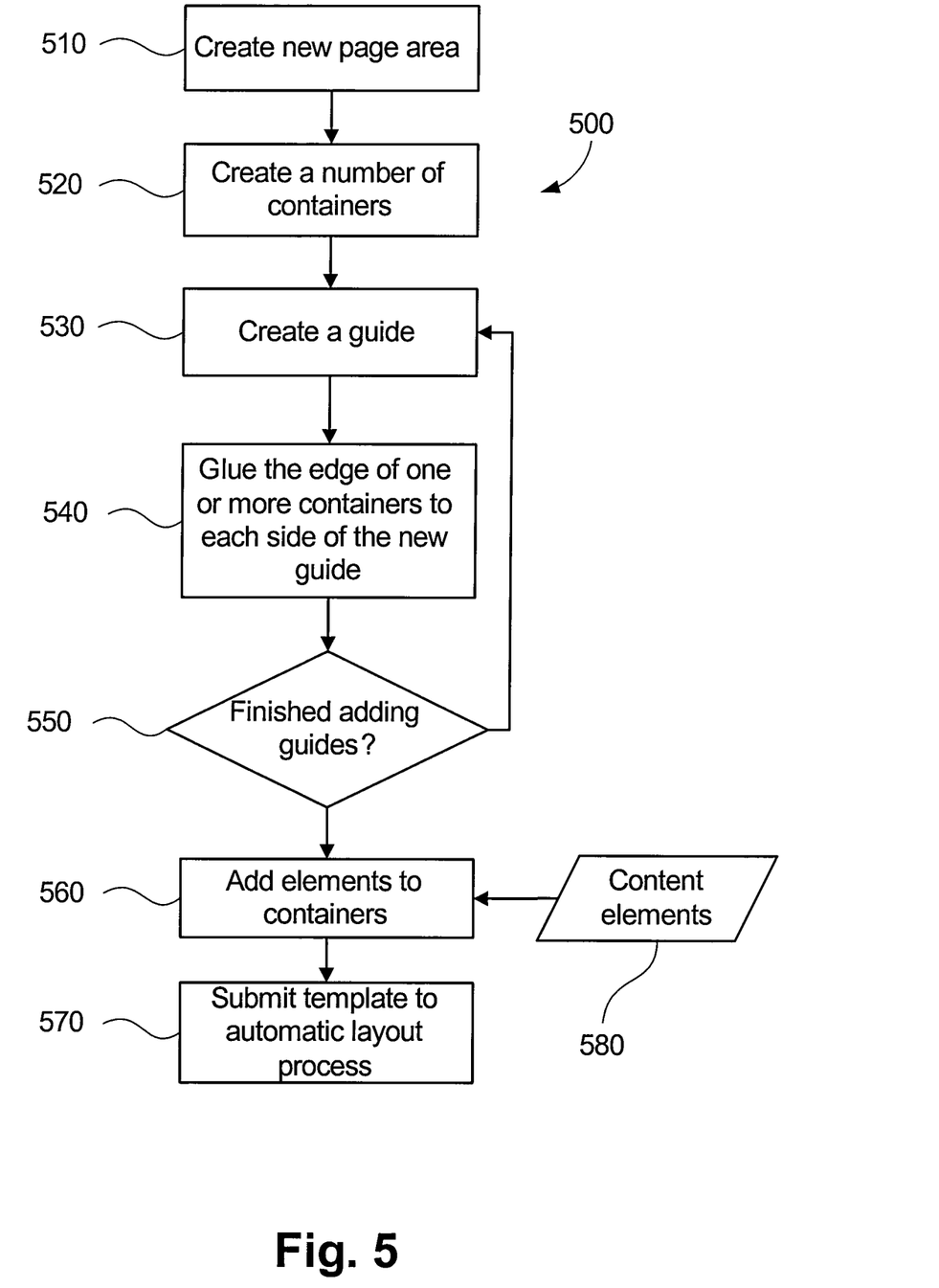
FIG. 5 is a flowchart representing the basic operation of the presently disclosed method.
Figure 6:
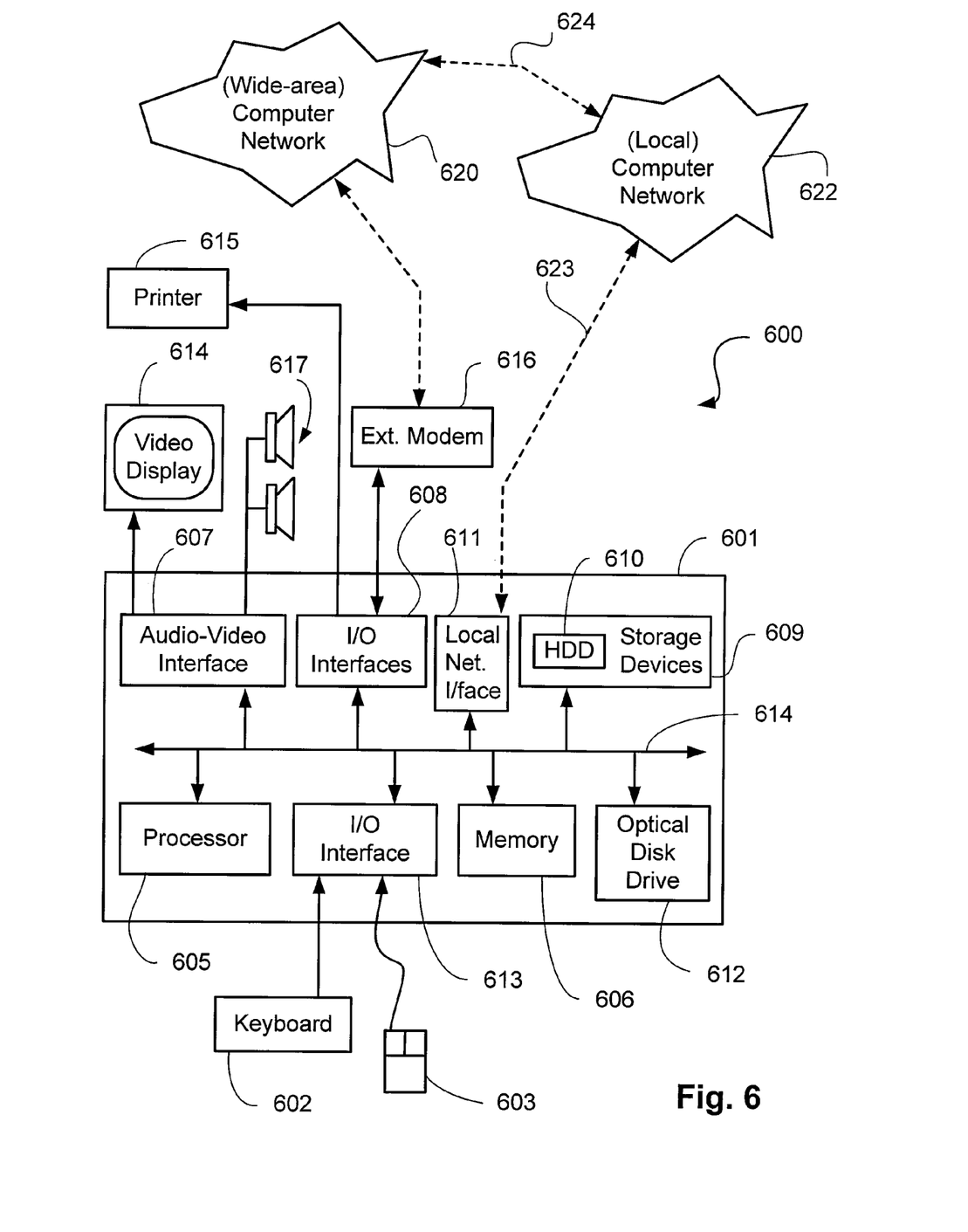
FIG. 6 is a schematic block diagram representation of a general purpose computer system upon which the described arrangements may be implemented.

The described methods of laying out containers and setting constraints may be implemented using a computer system 600, such as that shown in FIG. 6 wherein the processes of FIGS. 1 to 5, 7 and 8 may be implemented as software, such as one or more application programs executable within the computer system 600. In particular, the steps of method of laying out are effected by instructions in the software that are carried out within the computer system 600. The instructions may be formed as one or more code modules, each for performing one or more particular tasks. The software may also be divided into two separate parts, in which a first part and the corresponding code modules performs the laying out methods and a second part and the corresponding code modules manage a user interface between the first part and the user. The software may be stored in a computer readable medium, including the storage devices described below, for example. The software is loaded into the computer system 600 from the computer readable medium, and then executed by the computer system 600. A computer readable medium having such software or computer program recorded on it is a computer program product. The use of the computer program product in the computer system 600 preferably effects an advantageous apparatus for setting constraints for laying out containers as part of a document production system.

As seen in FIG. 6, the computer system 600 is formed by a computer module 601, input devices such as a keyboard 602 and a mouse pointer device 603, and output devices including a printer 615, a display device 614 and loudspeakers 617. An external Modulator-Demodulator (Modem) transceiver device 616 may be used by the computer module 601 for communicating to and from a communications network 620 via a connection 621. The network 620 may be a wide-area network (WAN), such as the Internet or a private WAN. Where the connection 621 is a telephone line, the modem 616 may be a traditional "dial-up" modem. Alternatively, where the connection 621 is a high capacity (eg: cable) connection, the modem 616 may be a broadband modem. A wireless modem may also be used for wireless connection to the network 620.

The computer module 601 typically includes at least one processor unit 605, and a memory unit 606 for example formed from semiconductor random access memory (RAM) and read only memory (ROM). The module 601 also includes an number of input/output (I/O) interfaces including an audio-video interface 607 that couples to the video display 614 and loudspeakers 617, an I/O interface 613 for the keyboard 602 and mouse 603 and optionally a joystick (not illustrated), and an interface 608 for the external modem 616 and printer 615. In some implementations, the modem 616 may be incorporated within the computer module 601, for example within the interface 608. The computer module 601 also has a local network interface 611 which, via a connection 623, permits coupling of the computer system 600 to a local computer network 622, known as a Local Area Network (LAN). As also illustrated, the local network 622 may also couple to the wide network 620 via a connection 624, which would typically include a so-called "firewall" device or similar functionality. The interface 611 may be formed by an Ethernet™ circuit card, a wireless Bluetooth™ or an IEEE 802.11 wireless arrangement.

The interfaces 608 and 613 may afford both serial and parallel connectivity, the former typically being implemented according to the Universal Serial Bus (USB) standards and having corresponding USB connectors (not illustrated). Storage devices 609 are provided and typically include a hard disk drive (HDD) 610. Other devices such as a floppy disk drive and a magnetic tape drive (not illustrated) may also be used. An optical disk drive 612 is typically provided to act as a non-volatile source of data. Portable memory devices, such optical disks (eg: CD-ROM, DVD), USB-RAM, and floppy disks for example may then be used as appropriate sources of data to the system 600.

The components 605, to 613 of the computer module 601 typically communicate via an interconnected bus 604 and in a manner which results in a conventional mode of operation of the computer system 600 known to those in the relevant art. Examples of computers on which the described arrangements can be practised include IBM-PC's and compatibles, Sun Sparcstations, Apple Mac™ or alike computer systems evolved therefrom.

Typically, the application programs discussed above are resident on the hard disk drive 610 and read and controlled in execution by the processor 605. Intermediate storage of such programs and any data fetched from the networks 620 and 622 may be accomplished using the semiconductor memory 606, possibly in concert with the hard disk drive 610. In some instances, the application programs may be supplied to the user encoded on one or more CD-ROM and read via the corresponding drive 612, or alternatively may be read by the user from the networks 620 or 622. Still further, the software can also be loaded into the computer system 600 from other computer readable media. Computer readable storage media refers to any storage medium that participates in providing instructions and/or data to the computer system 600 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 601. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 614. Through manipulation of the keyboard 602 and the mouse 603, a user of the computer system 600 and the application may manipulate the interface to provide controlling commands and/or input to the applications associated with the GUI(s).

As schematically illustrated in FIG. 4, a preferred method of setting constraints on containers is implemented within a constraint setting GUI 410. A user 400 interacts with the constraint setting GUI 410 in order to define the constraints for, and insert content elements 425 into containers within a template 415 to thereby define a constrained automatic layout of the page 430 to be formed. When instructed by the user 400, the constraint setting GUI 410 passes the template 415 to an automatic layout process 420. The automatic layout process 420 produces the final laid out page 430 as output. The modules 410 and 420 are preferably implemented as distinct parts of the document layout software application running on the computer system 600. The template 415 may be derived from the storage devices 609, disk 612 or the networks 620, 622 depending upon the functionality of the application, which may be server-based and executed on the computer 601 acting as a client.

Figure 1A:
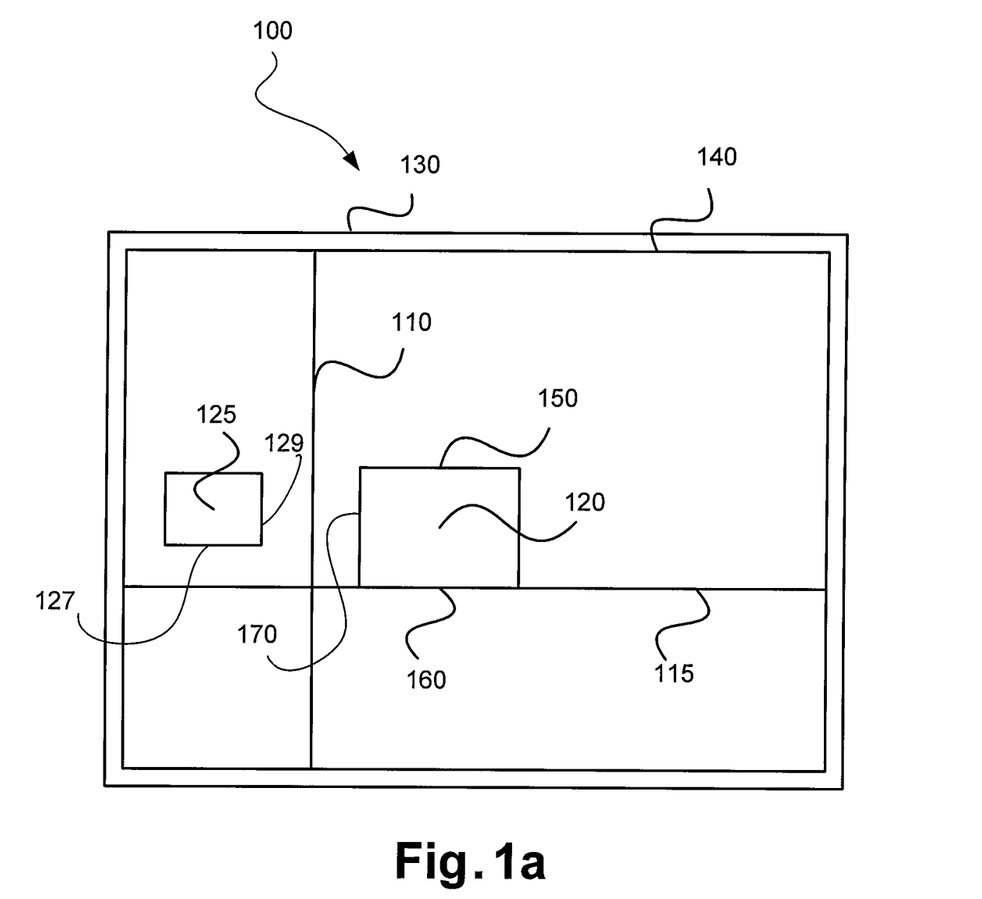
FIG. 1a is a diagram that illustrates the operation of the method of laying out containers.

Referring to FIG. 1a, the presently disclosed method enables constrained automatic layout through the addition of guides, such as guides 110 and 115, to an area 140 representing a GUI 100 of the page to be laid out. The GUI 100 is typically displayed upon the display device 614 and manipulated by the user operating input devices such as the mouse 603, which has an associated pointer or cursor within the GUI 100 (not illustrated) and the keyboard 602. The GUI 100 is desirably part of the GUI 410. The automatic layout operates upon containers represented in the page and into which content is insertable. In this description, unless otherwise noted, a container will have edges whose position upon layout is independent of the content inserted in the container. That is, unless moved through some specific operation or association, a container in the layout has a fixed position and size.

A guide is a line or other reference to which an edge of a container, that runs parallel to the guide, can be affixed, connected or "glued", as termed by the present inventors. In FIG. 1a, a guide 115 is parallel to an edge 160 of a container 120. A container with an edge glued to a guide is said to be glued to the side of the guide on which the container lies. In this example, the container 120 is glued to an upper side of the guide 115. For example, the container 120 may be further glued to the left or the right of the vertical guide 110 by way of a vertical edge 170 thereof.

In the described arrangements, guides are either horizontal (e.g. 115) or vertical (e.g. 110), and span the page. Guides are preferably placed in the layout by clicking in a designation area 130 of the GUI 100 at a border of the page area 140. Guides can also be moved by clicking and dragging the guide to a new location. A container can be moved in a similar fashion. A container is preferably glued to a guide by placing one of the edges of the container in the same position as the guide. This is shown in FIG. 1a for the edge 160 of container 120 and the guide 115.

Figure 1B:
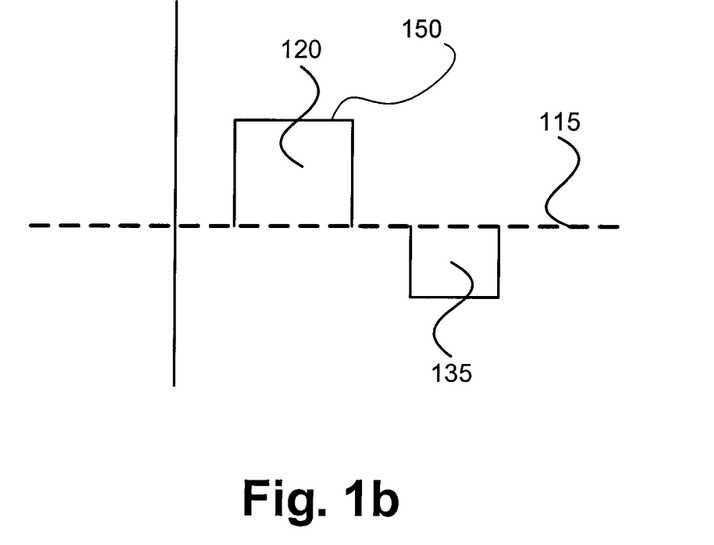
FIG. 1b illustrates how a guide becomes movable when one or more panels are glued to each side of the guide.
Figure 1C:
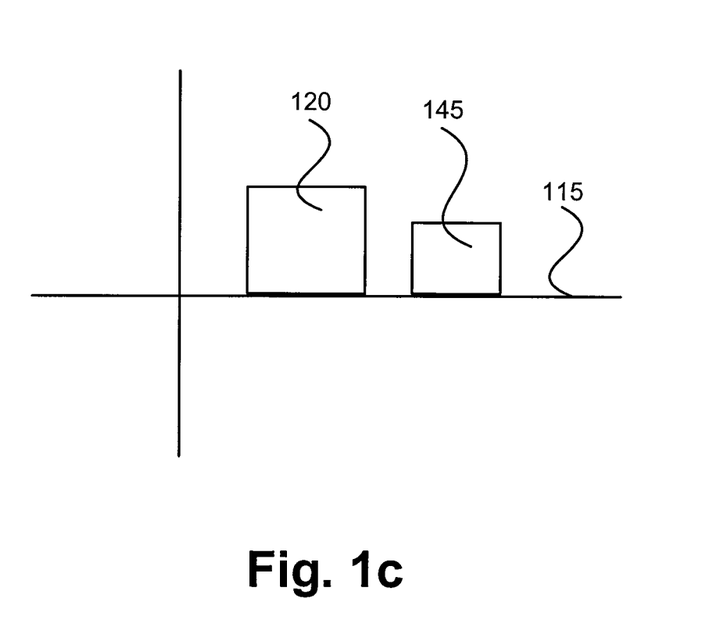
FIG. 1c illustrates how a guide does not become movable when panels are glued to only one side of the guide.

Referring to FIG. 1b, when at least one container (e.g. 120 and 135) has been glued to either side of the guide 115, the guide 115 becomes movable by the automatic layout process. This is depicted in FIG. 1b by the guide 115 being shown in dashed representation. Moreover, in this example, the guide 115 is movable vertically, in view of its horizontal orientation All containers glued to a movable guide take part in layout negotiations. The negotiations, which are implemented by the layout process 420, will determine the ultimate placement of the guide. In turn, each edge that is glued to the movable guide will move with the movable guide. In the example of FIG. 1b, as each of these edges moves with the guide 115, the size of the corresponding containers 120 and 135 will increase or decrease. Any edge not glued to a guide, such as the edge 150, will remain fixed in place.

Similarly, any guide without one or more edges on each side will remained fixed in place. For example, referring to FIG. 1c, guide 115 will remain fixed in place because, although containers 120 and 145 are glued to one side of the guide 115, there are no containers glued to the opposite side.

Referring now to FIG. 5, a flowchart of a constraint setting method 500 as implemented within the constraint setting GUI 410 of FIG. 4, will now be discussed. The method 500 is preferably implemented as software within the layout application mentioned above. A nominal entry point to the method 500 involves the creation of a page area at step 510. At step 520 which follows, user input is detected for the creation of a number of containers within a template 415 for holding the page content. The template 415 may be selected from a number of alternatives available and suited to various document types or styles. On each occasion where the user wants two or more containers to negotiate for space, a guide is created at step 530 in response to user operation. The method 500 in step 540 detects user operation as described above to then connect or glue the containers to be involved in the negotiation to either side of the guide formed in step 540. In order for the guide to be movable, there should be at least one container glued to each side of any guide. Step 550 operates to prompt the user via the GUI 410 to add further guides. Where such is desired and detected from user operation, the method 500 returns to step 530. When no more guides are required at step 550, under user control, content elements 580 are able to be inserted into the containers at step 560. The modified template 415 can then be submitted at step 570 to the automatic layout process 420 (FIG. 4) to produce the laid-out document 430. Note that some operations, such as inserting elements into containers at step 560, can be interleaved with other operations.

Figure 2:
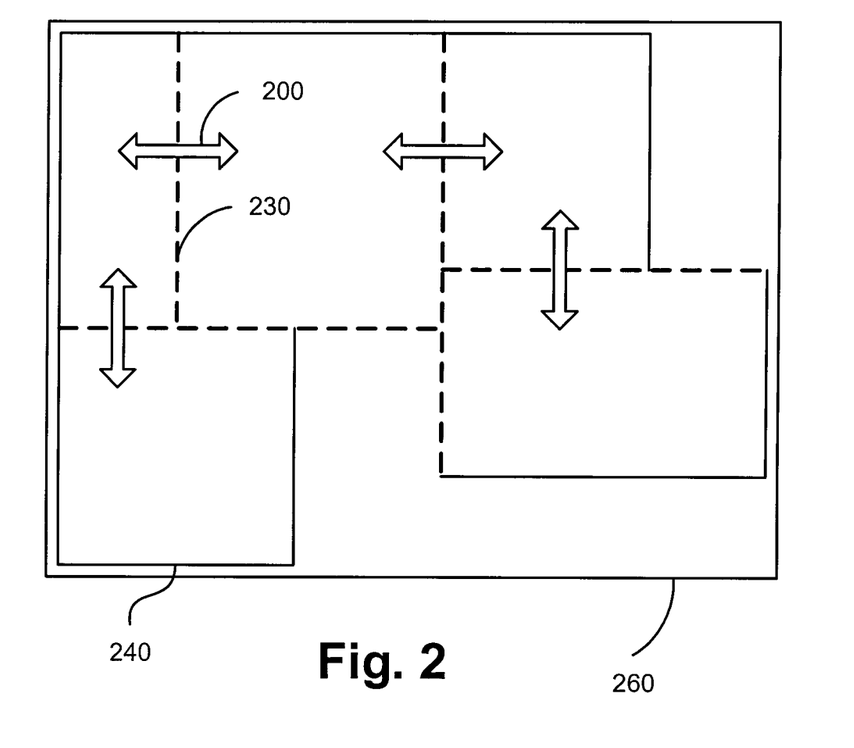
FIG. 2 illustrates an example of how constrained automatic layout takes place through negotiation on a set of containers with constraints set according to the present disclosure.

FIG. 2 illustrates a number of containers with constraints set using the method 500. Fixed edges (e.g. 240) are represented with solid lines. Movable edges (e.g. 230)—that is, edges that have been glued to a guide that is movable—are represented with dashed lines. After negotiation, each movable edge may either remain in its position, or move in one of two directions as indicated by each of the double-headed arrows (e.g. 200).

Figure 3A:
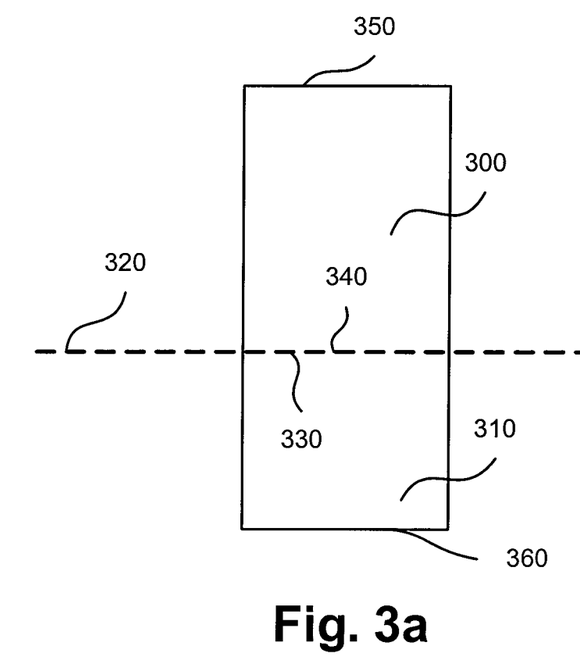
FIG. 3a is an illustration of the operation of the presently disclosed method in a simple case, consisting of a guide with a panel glued to either side.
Figure 3B:
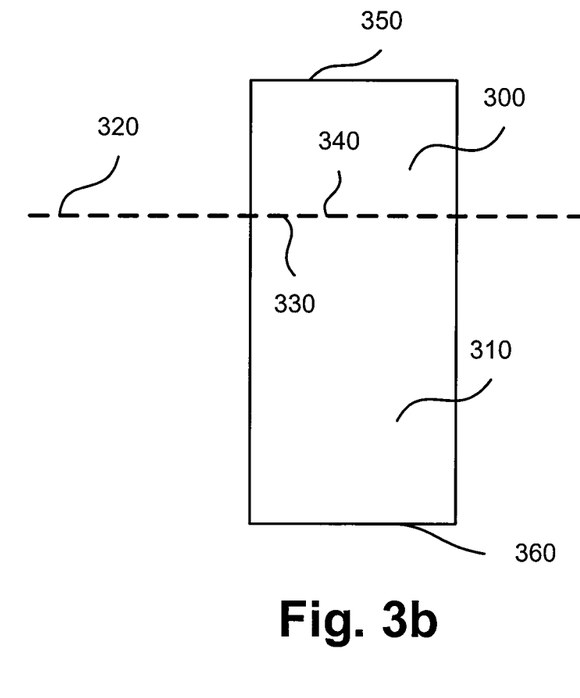
FIG. 3b depicts a possible new configuration of FIG. 3a after negotiation has taken place.

For example, referring to the layout illustrated by FIG. 3a, the two containers 300 and 310, each glued to a guide 320, are thereby arranged to negotiate to determine their final respective sizes. When negotiation has completed according to the content inserted into each and the process 420, as illustrated by the example of FIG. 3b, the guide 320 has moved, reflecting the results of the negotiation, with the container 300 being reduced in size and the container 310 being correspondingly increased in size. The movable edges 330 and 340 glued to the guide 320 have moved with the guide 320. The fixed edges (e.g. 350 and 360) have remained in place. Content to be inserted into a container will have a certain quantum that determines the dimensions of the container sufficient to reproduce the content. For example a portion of text at a particular font size may require a container having an area of 100 $cm^2$ to fully reproduce the content. Clearly that container may have a size of 10 cm×10 cm, or 20 cm×5 cm, and so on. As such the content can be considered to have dimensions which establish a basis for varying the size of a container to properly accommodate the content, whilst still satisfying the designed layout of the page according to relationships with other containers.

Each of the containers involved in negotiations preferably is configured with a minimum size in each dimension, which thereby limits the movement range of any movable guide glued to the container. For example, in FIG. 3b, the guide 320 cannot move vertically past edge 350 if the minimum height of the container 300 is zero. Containers may also have a maximum size.

The role of a layout engine used for the automatic layout process 420 is to adjust size and position of containers to best fit a given set of constraints. As such, a layout engine is a constraint solver, various types of which are known in the art. One common form of constraint solver performs "convex optimisation", or optimising a convex objective function over a convex subset of a vector space. Another common form of constraint solver creates new candidate solutions by making small random changes to the constrained variables, and selects candidates that score well according to an objective function, until no better solution can be found. Some well-known forms of solver of this type are "genetic algorithms" and "simulated annealing".

A constraint problem typically involves a set of constraints which must be satisfied exactly, and a second set used to guide the solver to a good solution, without necessarily satisfying all such constraints. The constraints which must be satisfied are referred to as "hard" constraints, and the constraints that may not necessarily be satisfied may be referred to as "soft" constraints. In a preferred implementation, strength and priority can also be assigned to constraints. Constraints with higher priority can override those with lower priority. For soft constraints with the same priority, those with higher strength have more influence in guiding the solver than those with lower strength.

Figure 7A:
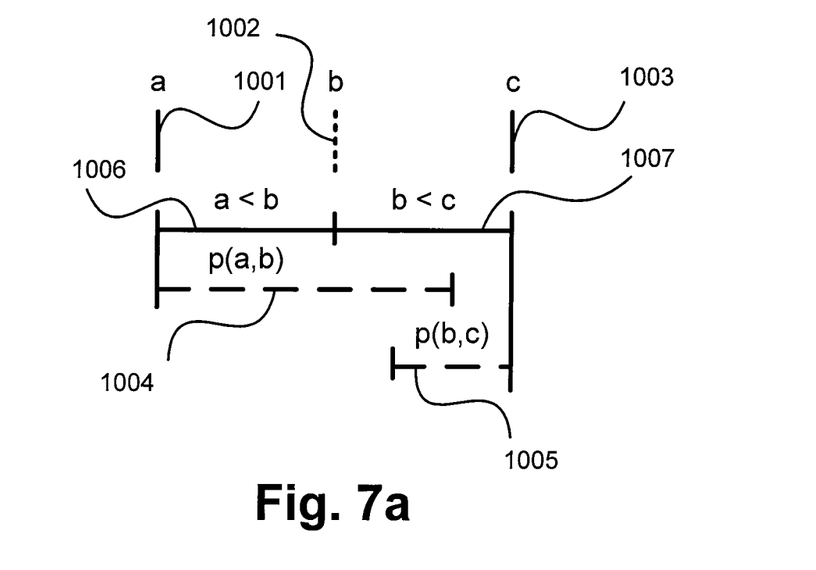
FIG. 7a illustrates a layout constraint problem and FIG. 7b shows a solution thereto.

FIG. 7a illustrates a constraint problem for automatic layout in one dimension. Items 1001, 1002, and 1003 are called "alignment marks", or just "marks". The marks each represent a position (labelled as a, b, and c respectively) in the layout space along a single axis. Marks 1001 and 1003 are fixed in place, as indicated by solid lines. That is, their position cannot be changed during automatic layout. Mark 1002 is movable, as indicated by a dotted line, but is forced by hard constraints 1006 and 1007 to remain between marks 1001 and 1003. Soft constraints 1004 and 1005 specify preferred offsets p(a, b) and p(b, c) between marks 1002 and 1001, and marks 1002 and 1003 respectively.

Figure 7B:
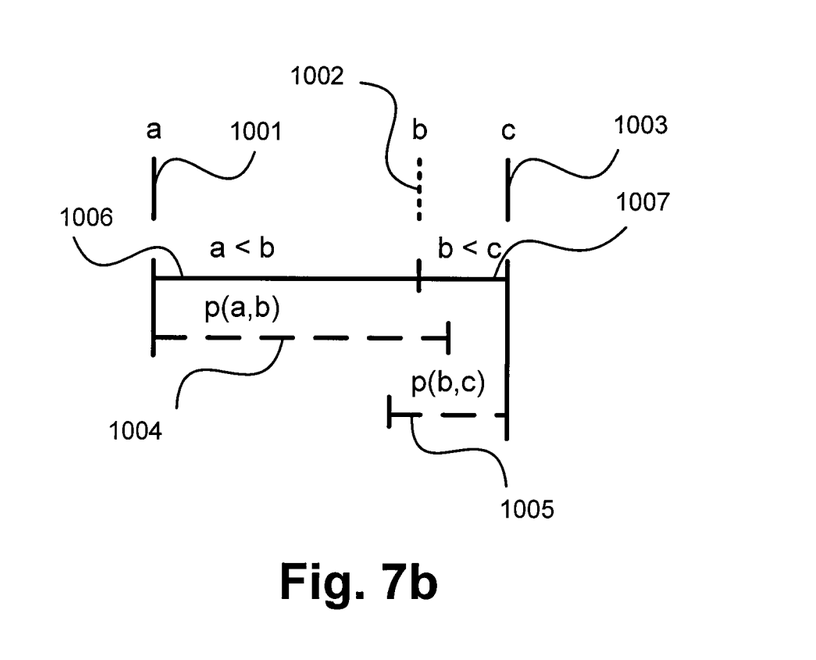

FIG. 7b shows a solution to the constraint problem of FIG. 7a. Mark 1002 remains between 1001 and 1003, but is now positioned at a compromise between preferred offsets 1004 and 1005. In a specific implementation, the layout engine of the process 420 models soft constraints 1004 and 1005 as linear springs with respective spring constants equal to the strength value of each constraint, and calculates the final position of 1002 at their equilibrium point using static mechanics principles.

In more than one dimension, containers can be defined by representing each of their edges as a mark along some axis. Typically, two perpendicular axes are used, allowing the definition of rectangular containers. Two marks along one axis are used to represent a container's top and bottom edges, and two marks along the perpendicular axis represent its left and right edges.

Additional soft constraints can be associated with a container, to specify its preferred size and shape. For example, a preferred size constraint can specify a preferred offset between a container's marks along the same axis. A preferred shape constraint can specify a relationship between marks along different axes. For example, a shape constraint could indicate that a container tries to maintain its aspect ratio, by specifying that the preferred distance between two marks on one axis is proportional to the actual distance between two marks on the other axis, and vice versa. As another example, a shape constraint could indicate that a container tries to maintain a constant area. It is often useful to specify both a preferred size and shape for each container, with different strengths to vary the degree of influence from each constraint. In a preferred implementation, shape constraints are solved for each axis by using a partial solution from other axes, iterating across all axes until equilibrium is reached.

Figure 8A:
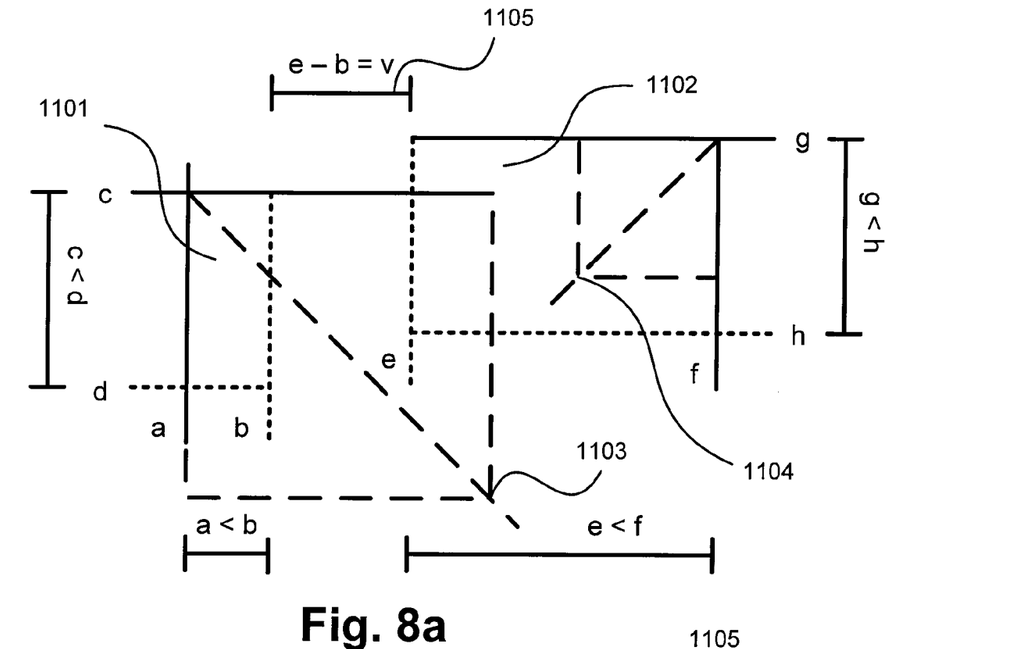
FIG. 8a illustrates a layout problem and FIG. 8b shows a solution thereto.

FIG. 8a shows an automatic layout problem in two dimensions. Rectangular content containers 1101 and 1102 are each defined by four marks across two axes, each labelled by a lower case letter indicating its position along the corresponding axis. The left and top edges of 1101 (marks a and c), and the right and top edges of 1102 (marks f and g), are fixed in place, and therefore drawn as solid lines, with their other edges (marks d, b, h, and e) moveable and therefore drawn as dashed lines. Both containers are constrained to have a positive size in each dimension. The hard constraint 1105 forces the right edge of 1101 (mark b) and the left edge of 1102 (mark e) to remain a fixed distance apart. Soft constraints 1103 and 1104 represent combined size and shape rules, each specifying a preferred size and aspect ratio, and are associated with containers 1101 and 1102 respectively.

Figure 8B:
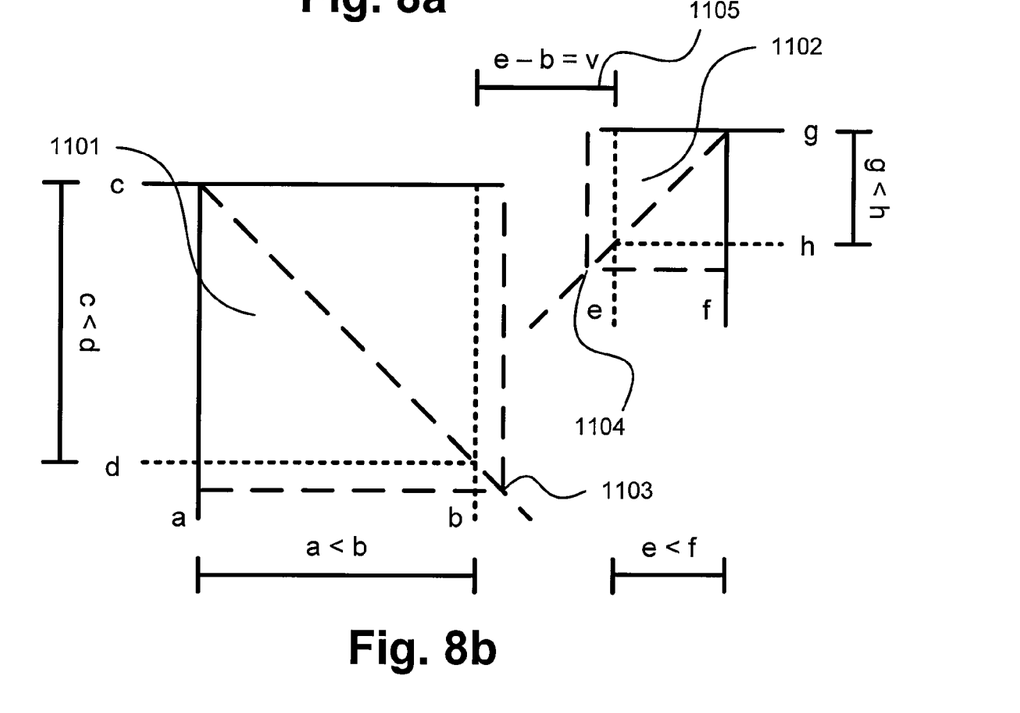

A solution to this layout is shown in FIG. 8b. The final bounds for 1101 and 1102 (with edges corresponding to marks d, b, h, and e drawn as dotted) are as close as possible to their preferred sizes, whilst maintaining all hard constraints, and staying close to their preferred aspect ratio. If the shape component was removed from constraints 1103 and 1104, allowing marks d and h to move independently of marks b and e respectively, both containers would reach their preferred height in this example.

Accordingly, using the layout engine described above within the process 420, constraints set via the GUI 410 may be negotiated to provide the laid-out page 430.

In an alternative implementation, edges may be glued to guides by snap dragging. Snap dragging is a technique well known in the art and which may be performed with aid of the mouse 603 in the GUI 410, where an object can easily be aligned with another by positioning the former close to the latter, and allowing the software to "snap" the former into alignment with the latter. Using this technique, edges can be "snap-glued" to guides, by positioning the edge within a certain threshold distance of the guide. Guides could be displayed as solid if they are moveable, and dashed if they are fixed. Alternatively, moveable guides could be displayed within the GUI using one colour, and fixed guides could be displayed using another colour. When a container edge is moved within the snap range of a guide, the appearance of the guide may be changed to indicate that the container may potentially be snapped to the guide. Other variations in appearance that could be used to indicate whether a guide is moveable or a potential snap target include line thickness, line dash patterns, line waviness, animation (such as "marching ants", commonly used in graphics programs to indicate selections, or blinking), or additional graphical or textual symbols added to the visual appearance of the guide.

In yet another implementation, edges may additionally be directly glued to each other. Edges become movable if a left edge is glued to a right edge, or a top edge to a bottom edge. Such edge pairs are referred to as "opposed pairs."

Further, in respect of the "opposed" nature of edges, returning to FIG. 1a, the edges 170 and 129 of the containers 120 and 125 respectively are "opposed" edges as they are parallel and face each other in relation to their respective positions on their respective containers, and also in this instance with respect to the guide 110. When both those edges 129 and 170 are glued to the guide 110, the guide 110 becomes movable (horizontally across the page). By contrast, gluing non-opposed edges does not result in the edges becoming movable. For example, again as seen in FIG. 1a, the edges 127 and 160 are not opposed (ie. they do not face each other, whether or not a guide is interposed therebetween). As such if the edges 127 and 160 are glued to the guide 115, the guide remains fixed and not able to move. Each of the corresponding containers may however, upon content being inserted, change in size, in this case by growing or shrinking in the vertical direction of the page.

In still a further implementation, all edges glued to a guide may maintain a fixed relative distance from each other. A fixed distance of zero would be equivalent to the behaviour described previously.

In still a further implementation, edges glued to a guide may maintain an approximate relative distance from each other. The approximate relative distance may comprise a preferred distance, and optionally a maximum distance and a minimum distance. The exact distance may be determined by treating the relative distance as a soft constraint.

The presently disclosed arrangements have various advantages over the prior art. Preferred implementations can be implemented with a simple user interface, where negotiating constraints may be set by snap-gluing edges to guides. Also, a clutter-free display will result for many types of layout designs, in comparison to using struts to represent constraints.

Further, with the described arrangements, the movement range of every movable edge is limited by other (fixed or movable) edges. In particular, the outer edges of the layout design will be fixed in place. This provides an implicit outer bounding box of all outer edges 260 within which the final laid-out containers must wholly lie, without needing to explicitly define a page boundary. It is noted that a slight separation between bounding box and containers has been shown for illustration purposes, in FIG. 1a for example, which need not be used in a practical implementation.

By gluing multiple containers to each guide, sophisticated networks of negotiating constraints can be constructed with little effort.

Figure 9A:
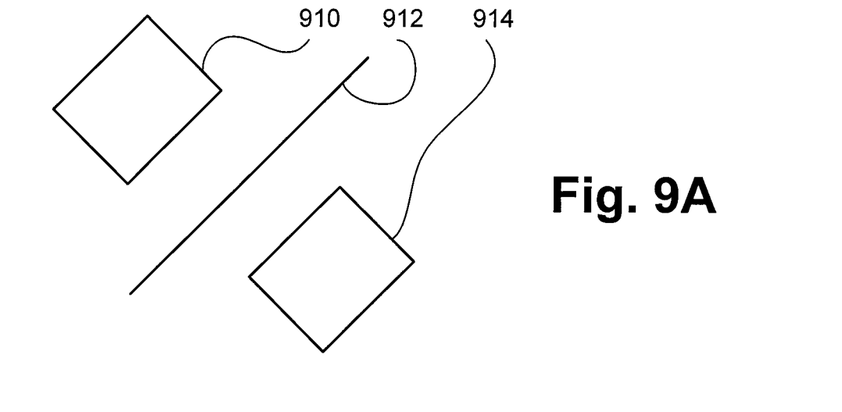
FIGS. 9A-9C show various alternate arrangements for guides and the gluing of associated containers.
Figure 9B:
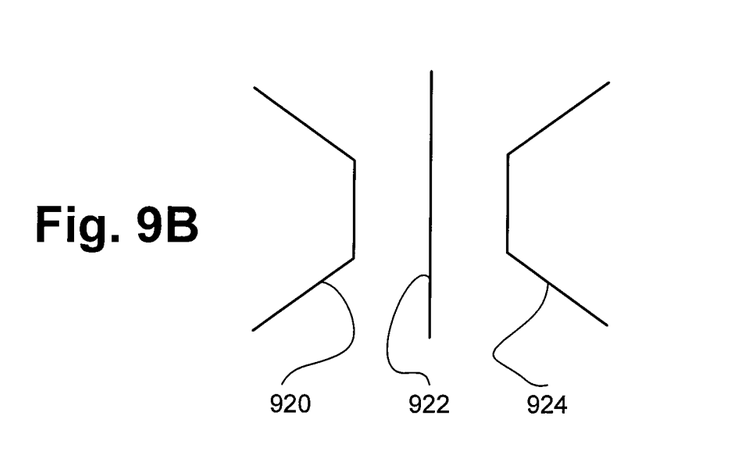
Figure 9C:
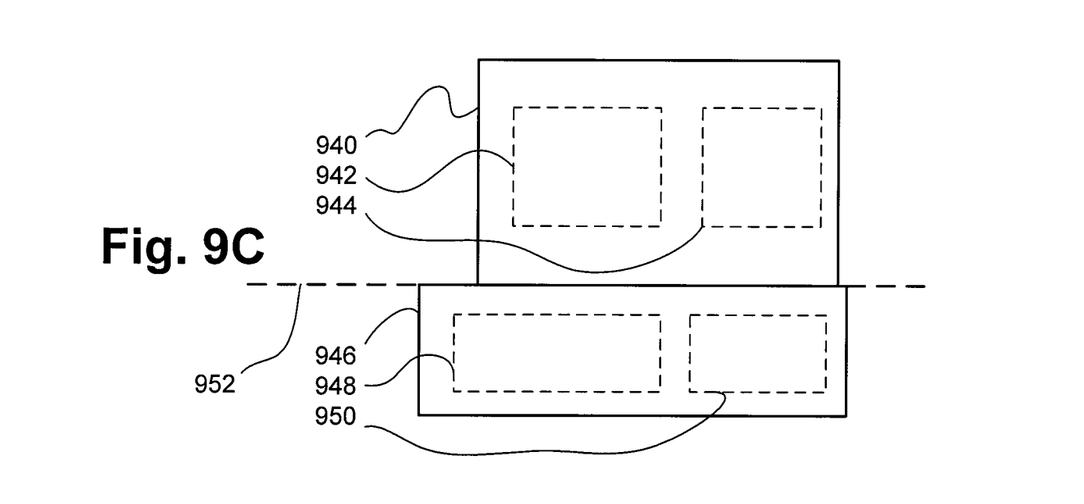

FIGS. 9A to 9C show alternate arrangements that may be used for the laying out of containers using guides. In FIG. 9A, a guide 912 is shown inclined to the boundaries of the page and to which containers 910 and 914 each have corresponding parallel edges. Those edges may therefore each be glued to the guide 912 according to the principles described above. In this example, any change in size of the containers 910 and 914 upon content being inserted will be perpendicular to the guide 912, and thus inclined to the page. In FIG. 9B a vertical guide 922 is shown which is associated with containers 920 and

924. Although the containers 920 and 924 are not rectangular, each possess a side parallel to the guide 922 and thus may be also glued to the guide 922 according to the principles described above.

Whilst the arrangements described all relate to containers glued to guides, panels may also be glued and handled in the same fashion. A panel in a document layout is akin to a meta-container or super-container in which a number of individual containers are arranged to negotiate locally within the panel during the layout process. Using alternate terminology, a glued container may be considered to enclose a number of sub-containers into each of which content is able to be placed upon laying out the page. FIG. 9C shows a horizontal guide 952 to which two panels 940 and 946 are glued. Within the panel 940, two containers 942 and 944 are arranged to receive variable content and to negotiate within the panel 940 to respectively size each other. Similarly the panel 946 has two containers 948 and 950 which operate in essentially the same way. During the automatic layout process 420, the panels 940 and 946 are initially negotiated in size by moving the guide 952. Once this has occurred, the containers within the respective panels are negotiated to establish their respective layout size and configuration.

Figure 10:
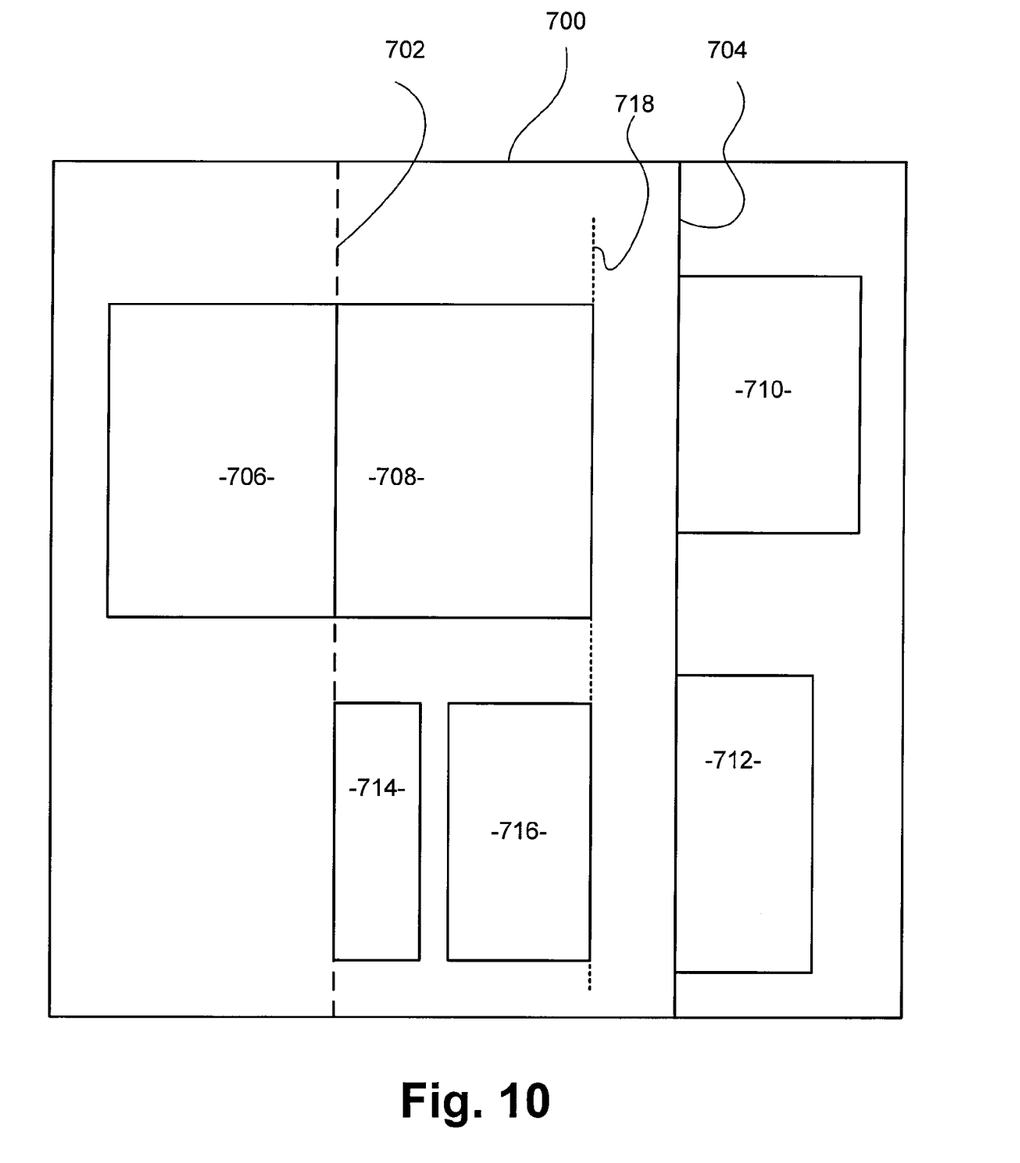
FIG. 10 shows an arrangement with multiple containers, guides and associated opposed and unopposed edges.

FIG. 10 shows a layout 700 for a page in which guides 702 and 704 are provided. Containers 706 and 708 each have opposed edges (as described above) that are parallel and glued to the guide 702. Since the edges are opposed, the containers 706 and 708 fall on either side of the guide 702 and thus the guide 702 is movable with content placed into each of the containers 706 and 708. For example, as the guide 702 may move left, the container 706 will reduce in width whereas the container 708 will correspondingly increase in width. Containers 710 and 712 are each associated with the guide 704 and have unopposed edges (as described above) that are glued to the guide 704. As such, the guide 704 remains fixed in its position on the page and each of the containers 710 and 712 will remain in fixed position and have fixed size. This configuration may be useful where it is desired for containers on the page have at least one edge aligned.

Also seen in FIG. 10 is a further container 714 having an edge glued to the guide 702. In this instance, although the container 708 is associated with the container 714 by unopposed edges glued to the guide 702, the presence of the container 706 provides that the container 714 will move with the guide 702, in a similar manner to the way in which the container 706 will also move. A further container 716 is shown having an unopposed edge associated or glued as a guide with the container 708, as indicated by the line 718. Accordingly those unopposed edges of the containers 708 and 716 coincident with the line 716 will remain fixed in the layout, even though the edges associated with the guide 702 may move with content inserted into those containers.

INDUSTRIAL APPLICABILITY

The arrangements described above are applicable to the computer and data processing industries and particularly to VDP applications and others requiring automated layout.

The foregoing describes only some embodiments of the present invention, and modifications and/or changes can be made thereto without departing from the scope and spirit of the invention, the embodiments being illustrative and not restrictive. For example, whilst in each of the examples provided the guide is a straight line, such is not essential. All that is required is a reference that may be considered parallel to some structure of the document being formed. A curved line may be used if associated with a container having a complementary curved side. As seen from FIG. 9B, irregular container shapes, styles or deployment may be used. Further, it is not required during the layout editing process to display guides, however such is most convenient and affords utility via the GUI. In this regard, an edge of a container (ie. an opposed or unopposed edge) may be designated as a guide, and associated with a parallel edge of one or more other containers. In view of all initial positions of containers and their edges being fixed, an edge becomes movable when associated with an opposed parallel edge of another container. As guides may be arranged in more than one direction (dimension), appropriately associated opposed containers may therefore have multiple edges that move upon insertion of content, as seen in FIG. 2.

We claim:

1. A computer-implemented method of automatically laying out a plurality of containers in a page layout to generate, with a processor, one or more documents upon insertion of content in the containers, said method comprising:
   (a) creating a plurality of containers, each said container having edges whose position in the page layout is independent of the content inserted in said containers and having at least one edge whose position is constrained by setting to be either content-independent or content-dependent in at least one direction, wherein a first container of said plurality of containers has an edge glued to a guide of the page layout and a second container of said plurality of containers also has an edge glued to the guide, and the guide is displayed as part of a graphical user interface representation of the page layout, and the edge of the first container and the edge of the second container are each associated with the guide;
   (b) setting the guide to be movable in the page layout, if the glued edges of the first container and the second container are opposed to each other with respect to the guide, to establish the opposed glued edges to be content-dependent; and
   (c) setting the guide to be fixed in the page layout, if the glued edges of the first container and the second container are positioned on the same side with respect to the guide, to establish the glued edges to be content-independent.

2. A method according to claim 1, said method further comprising:
   (a) creating a guide in relation to a first edge of one container of said plurality of containers;
   (b) creating an association between said guide and a further edge of a further container of said plurality of containers, which is parallel and opposed to said first edge, said association constraining said further edge of said further container in relation to said guide; and
   (c) laying out said containers such that said guide moves dependent on the content inserted in at least one of said plurality of containers.

3. A method according to claim 2, wherein said guide moves dependent on content inserted in said one container and on content inserted in said further container.

4. A method according to claim 2, wherein the relation between the guide and the container edge is one of:
   an approximate relative distance relation; and
   a fixed distance relation.

5. A method according to claim 1, said method further comprising:
   (a) creating an association between a first edge of a first container of said plurality of containers and a further edge of a further container of said plurality of containers that is parallel to said first edge, said association constraining said edge of said further container in relation to said first edge; and
- (b) where said further edge of said further container is opposed to said first edge, laying out said containers such that said first edge moves dependent on the content inserted in said containers; and
- (c) where said further edge of said further container is unopposed to said first edge, laying out said containers such that said first edge is fixed on the page.

6. A method according to claim 5, wherein the relation between the guide and the container edge is one of:
   an approximate relative distance relation; and
   a fixed distance relation.

7. A method according to claim 1, said method further comprising:
   - (a) creating an association between a first edge of said first container and a second edge of said second container that is parallel and opposed to said first edge of said first container, said association constraining said second edge of said second container to be in relation to said first edge of said first container;
   - (b) laying out said containers such that said first edge of said first container moves dependent on the dimensions of content inserted in said first and second containers;
   - (c) creating an association between a third edge of a third said container and another edge of another container of said plurality of containers on the page, said another edge of said another container being parallel and unopposed to said third edge of said third container, said association constraining said another edge of said another container to be in relation to said third edge of said third container.

8. A method according to claim 7, wherein said another container comprises one of said first container and said second container.

9. A method according to claim 7, wherein said another container comprises a fourth container.

10. A method according to claim 7, wherein the relation between the guide and the container edge is one of:
    an approximate relative distance relation; and
    a fixed distance relation.

11. A method according to claim 1, wherein at least one of said containers comprises a plurality of sub-containers in which content is placed upon laying out the page, wherein positions of said sub-containers with said one container is determined by constraints associated with said sub-containers.

12. A method according to claim 1, wherein the edges in association are inclined to a boundary of the page.

13. A method according to claim 9, wherein said guide is inclined to the boundary.

14. A method according to claim 1, wherein laying out the containers comprises performing convex optimisation to determine the positions of the container edges.

15. A method according to claim 1, wherein laying out the containers comprises using container priorities to determine the positions of the container edges.

16. A method according to claim 1, further comprising setting the position of said at least one edge of one said container to be content-dependent in a particular direction to thereby bound the position of said one edge in said particular direction if the position of said one edge would otherwise not have been bounded.

17. A graphical user interface for automatically creating a page layout for document generation, the page layout comprising a plurality of containers into which content is insertable to generate the document, said graphical user interface comprising:
   a display space upon which a representation of the page layout is formed;
   means for creating a plurality of containers in the page layout, each said container having edges whose position in the page layout is independent of the content to be inserted in said containers;
   means for identifying a reference in relation to a first edge of one container of said plurality of containers;
   means for displaying the reference as part of the page layout;
   means for creating an association between said reference and a further edge of a further container of said plurality of containers, said further edge being parallel to said first edge, said association constraining said further edge of said further container to be in relation to said reference;
   means for setting, in the case where the parallel first and further edges are associated with said reference and are opposed to each other with respect to the reference, the reference to be movable in the page layout, thus establishing the parallel first and further edges to be dependent on the content inserted in the corresponding containers; and
   means for setting, in the case where the parallel edges are associated with said reference and are positioned on the same side with respect to the reference, the reference to be fixed in the page layout, thus establishing the parallel edges to be independent of the content to be inserted in the corresponding containers.

18. A graphical user interface according to claim 17, wherein said reference comprises a guide represented in the page layout.

19. A graphical user interface according to claim 18, wherein the relation between the guide and the container edge is one of:
    an approximate relative distance relation; and
    a fixed distance relation.

20. A graphical user interface according to claim 17, wherein said reference comprises said first edge of said one container.

21. A graphical user interface according to claim 17, comprising:
   - (a) first means for displaying a reference having an association to said first edge of said one container, and having an association to said further edge, of said further container, that is parallel and opposed to said first edge; and
   - (b) second means for displaying a reference having no associations to edges, or having associations to edges that are not parallel or not opposed;
   wherein the first means and the second means can be distinguished visually by a user.

22. A graphical user interface according to claim 21, wherein the first means comprises at least one of:
   - (i) drawing a line of a first color, and the second means comprises drawing a line of a second color; and
   - (ii) drawing a dashed line, and the second means comprises drawing a solid line.

23. A graphical user interface according to claim 17, wherein the means for identifying a reference in relation to a first edge of one said container comprises allowing a user to drag the first edge to within a fixed distance of the reference, and changing the visual appearance of the reference when the first edge is dragged within the fixed distance.

24. A computer readable storage medium having a computer program recorded thereon, the program being executable by a computer to automatically lay out a plurality of containers in a page layout to generate one or more documents upon insertion of content in the containers, said program comprising:

code means for creating a plurality of containers, each said container having edges whose position in the page layout is independent of the content inserted in said containers;

code means for creating a guide in relation to a first edge of one container of said plurality of containers and associating the guide with the first edge;

code means for displaying the guide as part of a graphical user interface representation of the page layout;

code means for creating an association between said guide and a further edge of a further container of said plurality of containers, said further edge being parallel to said first edge, said association constraining said further edge of said further container to be in relation to said guide;

code means for setting, in the case where the parallel first and further edges are associated with said guide and are opposed to each other with respect to said guide, the guide to be movable in the page layout, thus establishing the opposed parallel first and further edges to be dependent on the content inserted in said one container and content inserted in said further container; and code means for setting, in the case where the parallel first and further edges are positioned on the same side with respect to the guide, the guide to be fixed in the page layout, thus establishing the parallel first and further edges to be independent of the content to be inserted in said one container and of the content to be inserted in said further container.

25. A computer readable storage medium having a computer program recorded thereon, the program being executable by a computer to automatically lay out a plurality of containers in a page layout to generate one or more documents upon insertion of content in the containers, said program comprising:

code means for displaying a graphical user interface representation of the page layout;

code means for creating a plurality of containers, each said container having edges whose position in the page layout is independent of the dimensions of the content inserted in said container;

code means for creating a first association between a first edge of a first container of said plurality of containers and a second edge of a second container of said plurality of containers, the second edge of the second container being parallel and opposed according to said first association to said first edge of said first container, said first association constraining said second edge of said second container to be in relation to said first edge of said first container;

code means for creating a second association between a third edge of a third container of said plurality of containers and another edge of another container of said plurality of containers on the page, said another edge of said another container being parallel and unopposed according to the second association to said third edge of said third container, said second association constraining said another edge of said another container to be in relation to said third edge of said third container;

code means for displaying each of the first association and the second association as part of the graphical user interface representation of the page layout;

code means for laying out said containers in the page such that at least said first edge of said first container moves dependent on the dimensions of content inserted in said first and second containers; and code means for laying out said containers such that at least said third edge of said third container is fixed in the page layout and independent of the dimensions of content inserted in said third container.

26. Computer apparatus configured to automatically lay out a plurality of containers to generate one or more documents upon insertion of content in the containers in a page layout, said apparatus comprising:

means for creating a plurality of containers, each said container having edges whose position in the page layout is independent of the content inserted in said containers;

means for creating a guide in relation to a first edge of one said container;

means for creating an association between said guide and an edge of a further said container that is parallel to said first edge, said association constraining said edge of said further container to be in relation to said guide;

means for displaying the guide as part of a graphical user interface representation of the page layout;

means for setting, in the case where the parallel edges are related to the guide and opposed to each other with respect to the guide, the guide to be movable in the page layout, thus establishing the parallel edges to be dependent on the content inserted in said one container and dependent on the content inserted in said further container; and means for setting, in the case where the parallel edges are related to the guide and are positioned on the same side with respect to the guide, the guide to be fixed in the page layout, thus establishing the parallel edges to be independent of the content to be inserted in said one container and independent of content to be inserted in said further container.

* * * * *